US012565830B2

(12) United States Patent
Bissell et al.

(10) Patent No.: US 12,565,830 B2
(45) Date of Patent: Mar. 3, 2026

(54) PROCESS FOR THE REDUCTION OF FLARING/VENTING GASES DURING COMPLETIONS OPERATIONS

(71) Applicant: Tara Energy Services Inc., Calgary (CA)

(72) Inventors: Scott Bissell, County of GP No1 (CA); Randal McNeill, Airdrie (CA); Braydon Garagan, Okotoks (CA)

(73) Assignee: Tara Energy Services Inc., Calgary (CA)

( * ) Notice: Subject to any disclaimer, the term of this patent is extended or adjusted under 35 U.S.C. 154(b) by 614 days.

(21) Appl. No.: 17/846,527

(22) Filed: Jun. 22, 2022

(65) Prior Publication Data

US 2023/0068476 A1 Mar. 2, 2023

(30) Foreign Application Priority Data

Jun. 25, 2021 (CA) ...................................... 3123214

(51) Int. Cl.
| | |
|---|---|
| *E21B 43/34* | (2006.01) |
| *B01D 5/00* | (2006.01) |
| *B01D 19/00* | (2006.01) |
| *C10L 3/10* | (2006.01) |
| *F17C 1/00* | (2006.01) |
| *F17C 9/00* | (2006.01) |
| *B01D 17/02* | (2006.01) |

(52) U.S. Cl.
CPC ............ *E21B 43/34* (2013.01); *B01D 5/0069* (2013.01); *B01D 19/0063* (2013.01); *B01D 19/0068* (2013.01); *F17C 1/00* (2013.01);

*F17C 9/00* (2013.01); *B01D 17/0214* (2013.01); *C10L 3/101* (2013.01); *F17C 2221/033* (2013.01); *F17C 2223/033* (2013.01); *F17C 2227/0157* (2013.01); *F17C 2250/043* (2013.01); *F17C 2250/0636* (2013.01); *F17C 2260/044* (2013.01)

(58) Field of Classification Search
None
See application file for complete search history.

(56) References Cited

U.S. PATENT DOCUMENTS

| | | | | |
|---|---|---|---|---|
| 2006/0070735 A1* | 4/2006 | Guerra | .................... | E21B 43/35 |
| | | | | 175/207 |
| 2015/0093259 A1* | 4/2015 | Pepper | .................... | F04B 23/10 |
| | | | | 417/54 |

(Continued)

*Primary Examiner* — Gabriel E Gitman
(74) *Attorney, Agent, or Firm* — Berg Hill Greenleaf Ruscitti LLP

(57) ABSTRACT

A process for the reduction of flaring/venting gases during completions operations on an oil/gas well, said process comprising providing a well in need of completion; providing a system to capture oil and gas generated by the well; the system including a primary separator to separate an incoming well stream into a plurality of streams wherein a first stream is sent to a pipeline and a second stream is sent for further processing. The process further includes flowing and collecting a third stream of gas in a gas pressure vessel; compressing the collected gas in the vessel until parameters of compressed gas are compressed to provide a constant feed to the pipeline; and transferring the compressed gas to the gas pipeline wherein the process reduces the amount of gas flared and/or vented during operation by over 80%.

7 Claims, 9 Drawing Sheets

(56)                References Cited

U.S. PATENT DOCUMENTS

2016/0200592 A1 *    7/2016   Barnes ..................... C02F 1/20
                                                                422/630
2018/0274347 A1 *    9/2018   Ricotta .................. E21B 43/34

* cited by examiner

PROCESS FOR THE REDUCTION OF FLARING/VENTING GASES DURING COMPLETIONS OPERATIONS

CROSS REFERENCE TO RELATED APPLICATIONS

This application claims the benefit of and priority to Canadian Patent Application No. 3,123,214, filed Jun. 25, 2021. The entire specification and figures of the above-referenced application are hereby incorporated, in their entirety by reference.

FIELD OF THE INVENTION

The present invention is directed to a novel process for the reduction of vented or flared gas in oilfield operations, more specifically during completions operations

BACKGROUND OF THE INVENTION

With increased government regulations many jurisdictions are incentivizing carbon or greenhouse gas emissions reductions. Major sources of these emissions are attributed to the oil and gas well completions process. The desire for reduced environmental impact of these operations has been increased significantly.

Brief Overview of Oil and Gas Wells and Completions

There are multiple phases over the lifetime of a well. First, a hydrocarbon reservoir needs to be explored and studied to locate hydrocarbons. Secondly, the well is drilled to the desired formation within the reservoir. Next, the well is prepared to the desired specifications, stimulating the well, flowing back stimulation fluids, running production tubing, and the associated down hole tools. The well then goes into production producing the hydrocarbons from the reservoir.

Current Existing Processes and Technology

Solution gas is the natural gas which is dissolved in the hydrocarbon reservoir with crude oil, condensate, and water. Solution gas is dissolved in the reservoir solution and remains dissolved until it experiences a pressure and temperature change.

Current industry practice is to vent solution gas out of 400 bbl tanks to atmosphere. The reason for this practice is the solution gas is typically considered as nuisance gas and is then discarded due to it being a volume treated as too small and insignificant to measure.

Another challenge is overcoming the hydrostatic pressure when a well is first opened post stimulation. For gas to be put into the sales line, the gas needs to reach a certain pressure threshold. If the gas does not meet this threshold, then the gas is disposed of as it would cost money and resources to have this natural gas raised to pipeline pressures. The hydrostatic pressure of the reservoir will keep the produced fluid pressure low until the well has been flowed through a clean-up period during the completions process.

The industry has already made steps to evolve through providing a service with the collection of solution and waste gas and flaring to reduce the carbon dioxide emission. The solution gas is captured from the high stage and low stage separator units and sent to flare, where it is combusted. To enable this shift from venting to flaring, a temporary flowback facility was developed to enable collection and safe re-direction to flare during initial flowback. This method has significantly reduced the use of standard 400 bbl atmospheric tanks and the overall GHG Emissions. It is estimated that half of operators have made the decision to utilize flaring off using pressurized units, while the other half of operators still use traditional venting out of 400 bbl tanks to dispose of solution gas.

GHG Emissions

Greenhouse Gases are defined by the United States Environmental Protection Agency as "gases that trap heat in the atmosphere" (United States Environmental Protection Agency 2020). The 4 main contributors to GHG emissions are carbon dioxide ($CO_2$), methane ($CH_4$), nitrous oxide ($N_2O$), and fluorinated gases. These gases all have an associated global warming potential (GWP) which measures how much energy the emissions of one ton of a gas will absorb over a given period of time, relative to the emissions of 1 ton of $CO_2$. The larger the GWP, the more that a given gas warms the Earth compared to $CO_2$ over that time period (United States Environmental Protection Agency 2020). The GWP of $CO_2$ is taken as 1, the GWP of $CH_4$ is 25, and the GWP of $N_2O$ is 298 (Carbon Neutral Government Regulation 2015). Natural gas is primarily composed of CH4 which is the leading cause of it having such a large impact on GHG emissions. GHG emissions are typically measured in equivalent mass of $CO_2$ emitted or tonnes carbon dioxide equivalent of $CO_2$-eq.

The traditional use of technology has been focused on venting large sources of waste gas.

In 2019 1.1 billion cubic meters of natural gas was flared in Canada and being a leading contributor of GHG emissions (CEC Fact Sheet #31). This equates to billions of dollars lost by oil and gas producers due to federal and provincial taxes and wasted natural gas. Currently, flareless completion flowback operations are not an operational or even a regulatory requirement.

In light of the above, there exists a clear need to improve completions flowback operations by measuring, capturing and using the waste solution gas which are generated during such operations. Natural gas flaring is commonly used in the petroleum industry to dispose of associated natural gases for a variety of reasons. Gas flaring attributes to a large portion of GHG production as the produced gas is burned on site. Such a process would not only generate energy from a resource which is wasted through venting and flaring but would also provide an attractive environmental solution to the presence of GHG which are more impactful per molecule than carbon dioxide, such as methane ($CH_4$).

SUMMARY OF THE INVENTION

It is desirable to put in place a process which can measure and capture the waste solution gas from high stage and low stage pressurized separator units which are conventionally disposed of by gas flaring and venting during flowback operations. With the implementation of the process according to the present invention, it is expected that the process will benefit all regional jurisdictions in their drive to reduce emissions and create a sustainable oil and gas sector.

With the advent of new technologies and a push for GHG emission reductions and the capability to measure this gas, the inventors have developed a new process to substantially reduce venting and/or flaring of solution gases during well completion operations as it has been determined that the flared and vented gas are of a significant volume and ultimately a sizable contributor to GHG emissions.

According to an aspect of the present invention, there is provided a process of well completion flowback operations to reduce the environmental impact of the oil and gas industry and improve industry standards. According to a preferred embodiment of the present invention, to capture waste gas during the completion flowback process (flow-back), there is the implementation of a pressurized gas storage and compression system of previously vented or flared solution or waste gas. The use of such a system enables the capture and storage of a sufficient amount of solution gas to then flow it inline to the pipeline to be sold rather than discharging by venting or flaring it into the atmosphere.

According to another aspect of the present invention, there is provided a process to eliminate regular venting or flaring use, creating a closed loop completion and testing environment that captures substantially all waste gas, compressing it to the pipeline to be conserved. Preferably, said completions process will provide a zero routine venting or flaring process in all completion flowback scenarios. Implementation of said preferred process will allow operators to achieve a sustainable operation while providing minimal impact to the environment.

According to a preferred embodiment of the present invention, the process comprises the use of three innovative technologies to successfully reduce GHG emissions: measurement devices used to measure the solution gas in the well fluid; pressurized vessels that separate and store well fluids; and a proprietary compression system.

According to an aspect of the present invention, there is provided a process for the reduction of flaring/venting gases during completions operations on an oil/gas well, said process comprising the steps of:

providing a well in need of completion;

providing a system to capture oil and gas generated by said well; wherein said system comprises:

a primary separator adapted to separate the incoming well stream into:

a first stream of pipeline-worthy gas;

a second stream of fluids;

a third stream of gas which is collected; and a fourth stream of oil condensate which is collected;

wherein said first stream of pipeline-worthy gas is sent to a pipeline and said second stream is sent for further processing;

a low pressure stage separator adapted to remove water and sand from said second stream of fluids and generating a fifth stream of oil condensate which is collected;

a low stage condensate separator wherein said fourth stream of oil condensate and said fifth stream of oil condensate are collected, said low stage condensate separator generating a sixth stream of gas which is collected;

a compression unit;

flowing said third stream of gas and sixth stream of gas to a gas pressure vessel;

collecting said third stream of gas and sixth stream of gas into said gas pressure vessel;

performing compression of said collected gas in said gas pressure vessel until parameters of compressed gas are such that it can be compressed by said compression unit providing a constant feed to said pipeline; and transferring said compressed gas to said gas pipeline;

wherein said process reduces the amount of gas flared and/or vented during a completions operation by over 80%.

According to a preferred embodiment of the present invention, the compression is carried out using a compressor comprising a built-in system to monitor the pressure of the solution gas.

According to a preferred embodiment of the present invention, the process further comprises the use of a flare stack only for use in an emergency case.

According to a preferred embodiment of the present invention, the process reduces the amount of gas flared and/or vented during completions operations by over 90%. According to another preferred embodiment of the present invention, the process reduces the amount of gas flared and/or vented during completions operations by over 95%. According to yet another preferred embodiment of the present invention, the process reduces the amount of gas flared and/or vented during completions operations by over 97.5%.

According to a preferred embodiment of the present invention, the compression is carried out in 2 stages, a first stage using two separate reciprocating compressor systems to pressurize the solution gas from approximately 40 psi (275.8 kPa) to approximately 400 psi (2,757.9 kPa) at a flow rate of 15.4 $e^3$ m$^3$/day, and flowing the resulting fluid to a second compression stage.

According to a preferred embodiment of the present invention, the second stage of compression using a single reciprocating compressor system which can pressurize the solution gas from approximately 400 psi to approximately 700 psi to 800 psi at a flow rate of 15.0 $e^3$ m$^3$/day.

According to a preferred embodiment of the present invention, the compression is carried a compressor system which is designed to handle a two-phase flow (liquids and gases).

Preferably, the system to capture oil and gas further comprises a metering unit adapted to measure the volume of at least one of said first, second, third, fourth, fifth, and sixth stream.

According to another aspect of the present invention, there is provided a process for the reduction of flaring/venting gases during completions operations on an oil/gas well, said process comprising the steps of:

providing a well in need of completion;

providing a system to capture oil and gas generated by said well; wherein said system comprises:

a primary separator adapted to separate an incoming well stream into:

a first stream of pipeline-worthy gas;

a second stream of fluids;

a third stream of gas which is collected; and a fourth stream of oil condensate which is collected;

wherein said first stream of pipeline-worthy gas is sent to a pipeline and said second stream is sent for further processing;

a compression unit;

flowing said third stream of gas to a gas pressure vessel;

collecting said third stream of gas into said gas pressure vessel;

performing compression of said collected gas in said gas pressure vessel until parameters of compressed gas are such that it can be compressed by said compression unit to provide a constant feed to said pipeline; and transferring said compressed gas to said gas pipeline;

wherein said process reduces the amount of gas flared and/or vented during a completions operation by over 80%. Preferably, said process reduces the amount of gas flared and/or vented during completions operations by over 90%. More preferably, said process reduces the amount of gas flared and/or vented during completions operations by over 95%. Even more preferably, said process reduces the amount of gas flared and/or vented during completions operations by over 97.5%.

Preferably, said system further comprises a low pressure stage separator adapted to remove water and sand from said second stream of fluids and generating a fifth stream of oil condensate which is collected. Also preferably, said system further comprises a low stage condensate separator wherein said fourth stream of oil condensate and said fifth stream of oil condensate are collected, said low stage condensate separator generating a sixth stream of gas which is collected. Preferably, the sixth stream of gas which is collected is sent to the gas pressure vessel.

Measurement

Solution gas is the dissolved gas within the well fluid. The volume of solution gas is a fraction of the total volume of well fluids that are processed by the separation vessels. This solution gas has been previously thought to be insignificant in volume and therefore has not been measured during flowback operations. Measurements taken of the solution gas that was being flared from the high stage and low stage separator units using the ABB meters. This gas volume is small when taken on an hourly rate, so it is traditionally not measurable. With the ABB meters it was made possible to measure the volume of solution gas flared over a 24-hour period. As shown in Table 1, the high stage and low stage separator units measured in total 570.482 $e^3$ $m^3$ of solution gas over a 3-month period, that was flared on PAD A-013-L.

Primary Separator

Well fluids are flowed from the wellhead to the primary separator. During the initial flowback or clean up stage, usually 3 to 4 days, the hydrostatic pressure in the well holds back the well fluids, causing the well fluids to flow at pressures below pipeline pressure. The fluids are separated and because the gas produced from these low pressure well fluids cannot overcome linepack, the gas is sent directly to the compressor to be compressed. After the initial phase has passed, the pipeline worthy gas is flowed directly to the pipeline and the water, sand, and condensate is flowed to the secondary (low stage) separator.

The basic principles of density and gravity are utilized to separate the well fluids. The solids sift to the bottom of the separator, the liquids sit on top of the solids separating into their two parts water and oil. Because water is denser than oil, the oil sits on top of the water and can be collected. The gas component is less dense than the solid and liquid phases and sits on top of the liquid phase.

Secondary Separator

The secondary separator provides separation at pressures less than 200 psi (1378.95 kPa) which allows for the required settling time to efficiently separate the solids, liquids, gases and for degassing the well fluids. The water and sand is dumped out of the separator and disposed of. The stabilized hydrocarbon liquids, after degassing, are collected and sold. The remaining solution and waste gas is collected and flowed to the compressor and then sent to the pipeline to be sold.

Pressurized Vessels

Pressurized vessels are broken into two different components: separation and storage. The high stage and low stage separators have both functions, but each are important for an understanding of the process. The primary pressurized separation vessels (high stage separators) separate the received well fluids by the phases of matter, solids (sand), liquids (water and oil), and gases. The well fluids are under high amounts of pressure and flow into the high stage separator. The well fluids enter through an inlet and then pass through an inlet diverter. Once the well fluids are inside the vessel, the basic principles of density and gravity are utilized. The solids sift to the bottom of the separator, the liquids sit on top of the solids separating into their two parts water and oil. Because water is denser than oil, the oil sits on top of the water and can be collected and sent to the low stage oil separator. The gas component is lighter than the solid and liquid phases and sits on top of the liquid phase.

During the separation process, the solution gas is still suspended in all 3 phases of the well fluid and needs multiple stages of separation to remove as much of the solution gas as possible. The solids and liquids undergo a second stage of separation under lower pressures in the secondary pressurized separation vessels (low stage separators). The gas phase that is still at high pressures is flowed to the pipeline to be collected and sold. If the gas phase does not reach pipeline pressure requirements, it is traditionally vented or flared. According to a preferred embodiment of the present invention, the process collects the solution and waste gas and flowed with the other well fluids to a second stage of separation at pressures below 200 psi. The solids are separated out and dumped into solid disposal tanks. The water is separated and flowed to water disposal tanks. The condensate (oil) is further processed to have any remaining water and solids separated out to produce pure condensate which is collected for future sale.

According to a preferred embodiment of the present invention, the process uses pressurized vessels for gas storage. Preferably, the pressurized vessels are equipped with appropriate instrumentation in order to monitor a range of pressures which will be utilized to provide a steady feed of solution gas to the compressor. As more solution gas is flowed into the gas pressure vessel, the vessel will continue to build pressure. According to a preferred embodiment, once the pressure vessel has reached 100 psi (689.5 kPa) the gas is released to a compressor. The solution gas is flowed to the compressor until the pressure in the gas storage vessel drops below 40 psi (275.8 kPa), then flow to the compressor is stopped. The gas storage vessel will then collect solution gas from the separators, building pressure in the storage vessel until 100 psi is achieved.

Gas Pressure Vessel

According to a preferred embodiment of the present invention, the gas pressure vessels are equipped with the capability to monitor a range of pressures which will be utilized to provide a steady feed of solution gas to the compressor. As more solution gas is flowed into the gas pressure vessel, the vessel will continue to build pressure. Once the pressure vessel has reached 100 psi (689.5 kPa) the gas is released to the compressor. The solution gas is flowed to the compressor until the pressure in the gas storage vessel drops below 40 psi (275.8 kPa), then flow to the compressor is stopped. The gas storage vessel will then collect solution gas from the separators, building pressure in the storage vessel until 100 psi is achieved.

Bypass Skid

According to a preferred embodiment of the present invention, there is a bypass skid which is designed so that in times of upset or emergency, the over pressurized fluids will pass through the back pressure valve and be safely flared at the emergency flare stack.

Compression

According to a preferred embodiment of the present invention, the process uses a compression system adapted to handled fluids containing liquids. Typical compressors used on oil and gas facilities are very particular in the circumstances they are used. Two typical obstacles are the ability for a compressor to handle liquids and the ability for a compressor to perform while hydrogen sulfide ($H_2S$ or sour gas) is present.

According to a preferred embodiment of the present invention, the ability of the compressor to perform high rates of compression under variable conditions allows it to handle liquids and gases. According to a preferred embodiment of the present invention, the compressor is designed in a way so that it has 2 separate compression stages. Stage 1 is comprised of two separate reciprocating electric-over-hydraulic compressor systems driven by a power source. Combined the two systems will be able to pressurize the solution gas from 40 psi (275.8 kPa) to 400 psi (2,757.9 kPa) at a flow rate of 15.4 $e^3$ m$^3$/day. This fluid is then flowed to the second compression stage. Stage 2 is comprised of a single reciprocating electric-over-hydraulic compressor systems driven by a power source. This system will pressurize the solution gas from 400 psi (2,757.9 kPa) to 700 psi (4,826.3 kPa) at a flow rate of 15.0 e3 m3/day. The solution gas will then be pumped to the pipeline and sold. According to a preferred embodiment of the present invention, the compressor system is a best fit design to meet current client's pipeline pressure requirements. The number of compression stages increases as the pipeline pressure requirements increase. The present invention uses a 2-stage compression system, but it is understood that there are variations to multi-stage compression systems that can accomplish the same goal.

Stage 1 of Compressor System

According to a preferred embodiment of the present invention, Stage 1 of the compressor system is comprised of two separate electric-over-hydraulic compressor systems driven by a power source. Combined the two systems will be able to pressurize the solution gas from 40 psi (275.8 kPa) to 400 psi (2,757.9 kPa) at a maximum flow rate of 15.4 e3 m3/day. Each compressor can be isolated via the ball valves on the tee's. This fluid is then flowed to the second compression stage.

Stage 2 of Compressor System

According to a preferred embodiment of the present invention, Stage 2 of the compressor system is comprised of a single electric-over-hydraulic compressor systems driven by a power source. This compressor will pressurize the solution gas from 400 psi (2,757.9 kPa) to 700 psi (4,826.3 kPa) at a maximum flow rate of 15.0 $e^3$ m$^3$/day. The solution gas will then be flowed to the pipeline and sold.

According to a preferred embodiment of the present invention, the compressor system is designed to handle two-phase flow (liquids and gases). The design of this compressor system allows it to sense the change in compressibility of the fluid entering into the compression chamber.

When there is a change in the compressibility of the fluid entering the compression chamber, the compression piston will then slow and instead of attempting to compress the liquid it will push it through the compression chamber to the discharge. Then, once the chamber has evacuated the liquid phase and is again filled with compressible gas, the piston will return to normal operating speeds to compress the gas to the discharge. The compressor can process 100% liquids intermittently, at a reduced capacity.

According to another preferred embodiment of the present invention, the compressor is designed using steel rated for H$_2$S conditions. H$_2$S combined with water creates a corrosive condition which will corrode the pipe. Preferably, the compressor is built according to NACE MR-01-75 specifications to be designed for H$_2$S present in the well fluids.

According to another preferred embodiment of the present invention, the compressor is an intricate system which has multiple components to ensure pressure requirements are met during variable conditions while also providing the highest level of safety for the process.

BRIEF DESCRIPTION OF THE FIGURES

Features and advantages of embodiments of the present application will become apparent from the following detailed description and the appended figures, in which.

DESCRIPTION OF PREFERRED EMBODIMENTS OF THE INVENTION

Figure 1:
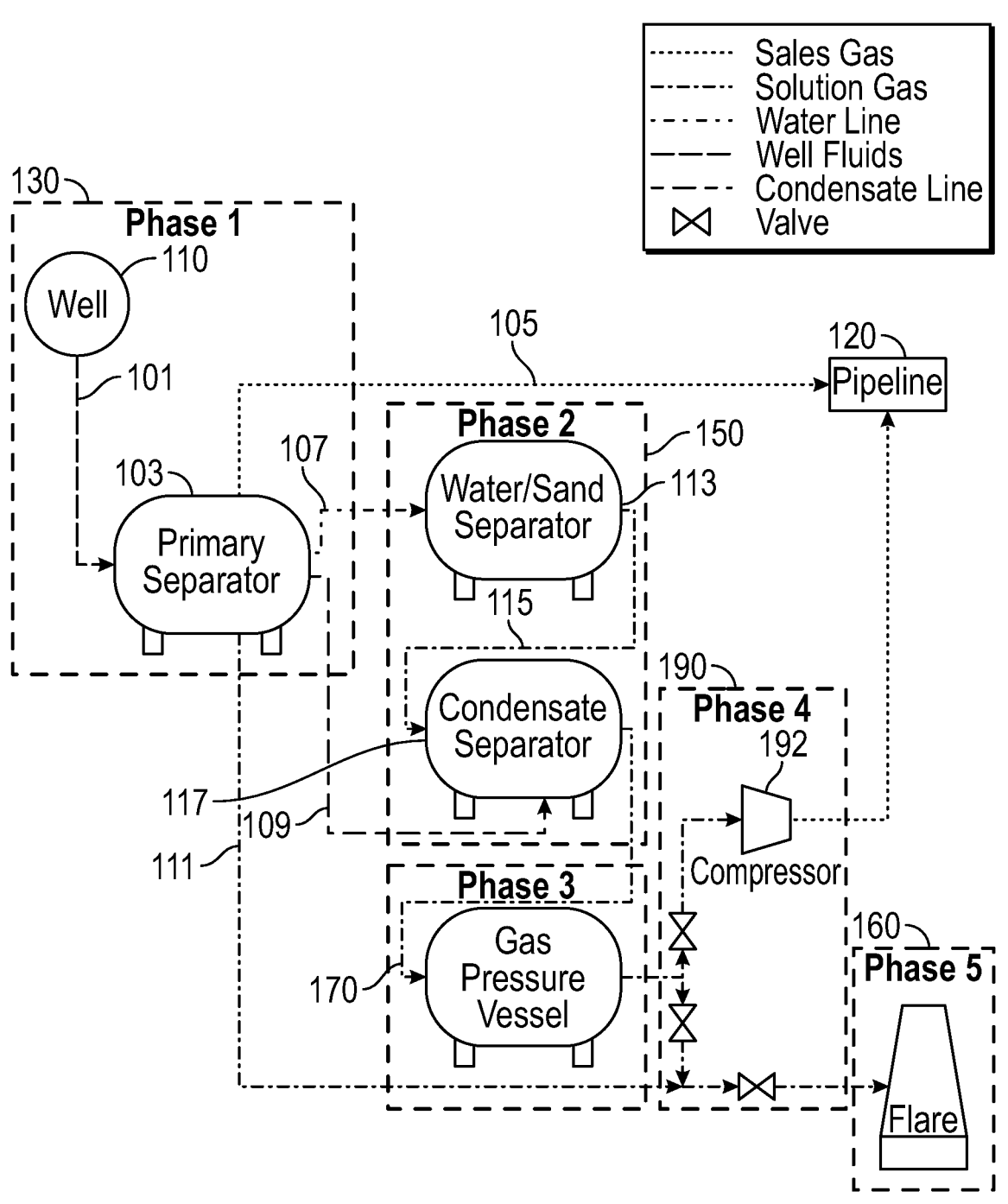
FIG. 1 illustrates a simplified process flow diagram for flowback operations according to a preferred embodiment of the present invention using pressurized storage and compression.

Illustrated in FIG. 1 is a Process Flow Diagram (PFD). The simplified process flow diagram is broken down into stages to provide a high-level process explanation.

In referring to FIG. 1, in a first phase (130) of the process, high velocity well fluids (101) are produced from the well (110) and flowed to a primary separator (103). The primary separator separates the pipeline-worthy gas into a stream (105) and sends it to the pipeline (120). A stream of solution gas (111) can be extracted from the primary separator (103) and sent to phase 4 (190) to a compressor (192). A stream of condensate (109) can be extracted from the primary separator (103) and sent to phase 2 (150). The remaining fluids stream (107) are sent to phase 2 (150). According to a preferred embodiment of the present invention, the primary separator is still connected to the flare stack (160) in the case of emergency well upset or similar emergency.

According to a preferred embodiment of the present invention, there is a bypass skid (not shown in FIG. 1) present before the compression system. In times of well upset or emergency the bypass skid will automatically switch the flow to the bypass line which is the top line on the outlet.

Figure 2:
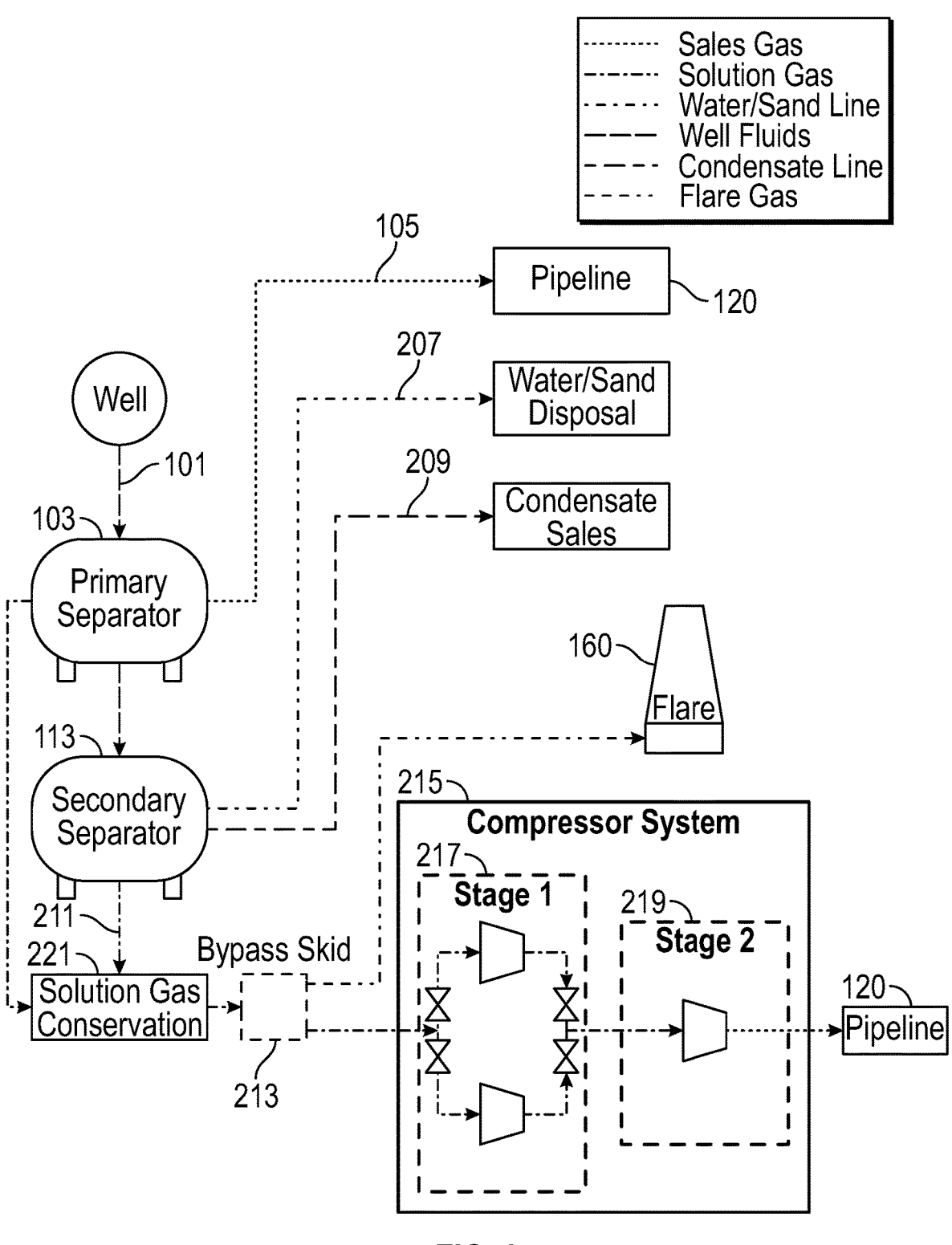
FIG. 2 shows a process flow diagram according to a preferred embodiment of the present invention.

As illustrated in FIG. 2, the second phase is where the remaining stream of fluids (107) undergo the final stage of separation at lower pressures. A stream of water and sand (207) is collected from the secondary (low stage) separator (113) and disposed of appropriately. The condensate (209) is collected to be sold. A stream of recovered solution gas (211) from the secondary (low stage) separator (113) which was further separated from the water sand fluid and condensate was flowed to the gas pressure vessel. The low stage separators (103 and 113) gas outlets are configured in series to collect the solution gas. According to a preferred embodiment of the present invention, this collection of solution gas allows recovery of sufficient quantities of gas at each step of the process (primary separator, water and sand separator, and the condensate separator) for subsequent compression and redirecting this recovered compressed solution gas to the pipeline (120).

The third phase is where the solution gas is collected and stored (221). As more solution gas is flowed into the gas storage vessel, the pressure in the vessel builds until pre-determined parameters are met, and then solution gas is transferred to the compressor system (215) providing a constant feed by passing through the bypass skid (213) which can re-direct the collected solution gas to the flare stack (160) in case of an emergency.

Figure 8A:
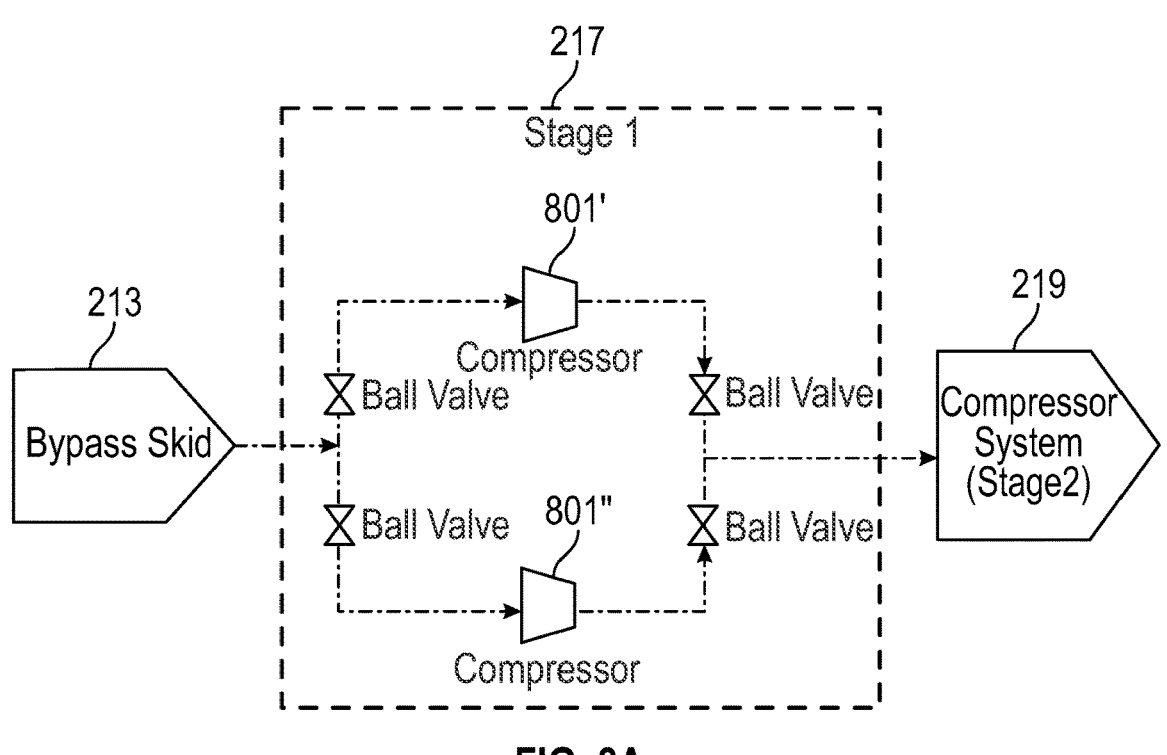
FIG. 8*a* illustrates a simplified process flow diagram for the stage 1 compression flow according to a preferred embodiment of the present invention.
Figure 8B:
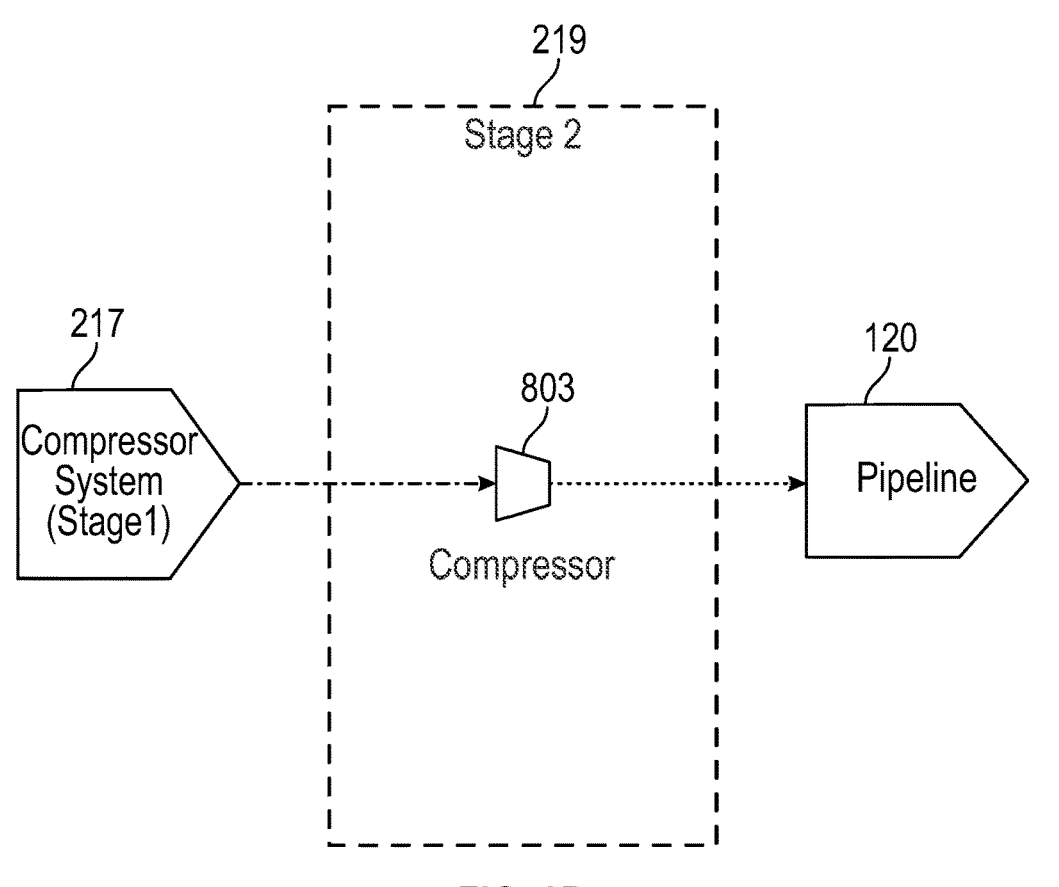
FIG. 8*b* illustrates a simplified process flow diagram for the stage 2 compression flow according to a preferred embodiment of the present invention.

As better illustrated in FIGS. 8a and 8b, according to a preferred embodiment, the compressor system (215) is comprised of a first stage of compression (217) and a second stage of compression (219) and compresses the solution gas to pipeline pressure so it can be conserved, flowed to the pipeline, and sold. There is a built-in system to monitor the pressure of the solution gas. This is solely for the purpose of protecting the compressor and ensuring safety. The first stage of compression (217) comprises a pair of compressors (801' and 801") arranged in parallel, while the second stage of compression comprises a single compressor (803) adapted to increase the pressure of the collected solution gas to achieve a pipeline pressure.

According to a preferred embodiment, a flare stack (160) can be retained as part of the process design for purely safety reasons in the event of an emergency. The flare will be utilized in cases where the compressor could be over-whelmed, and pressure needs to be relieved. The solution gas in these cases will be flowed to the flare stack to be combusted in emergency situations.

Figure 9:
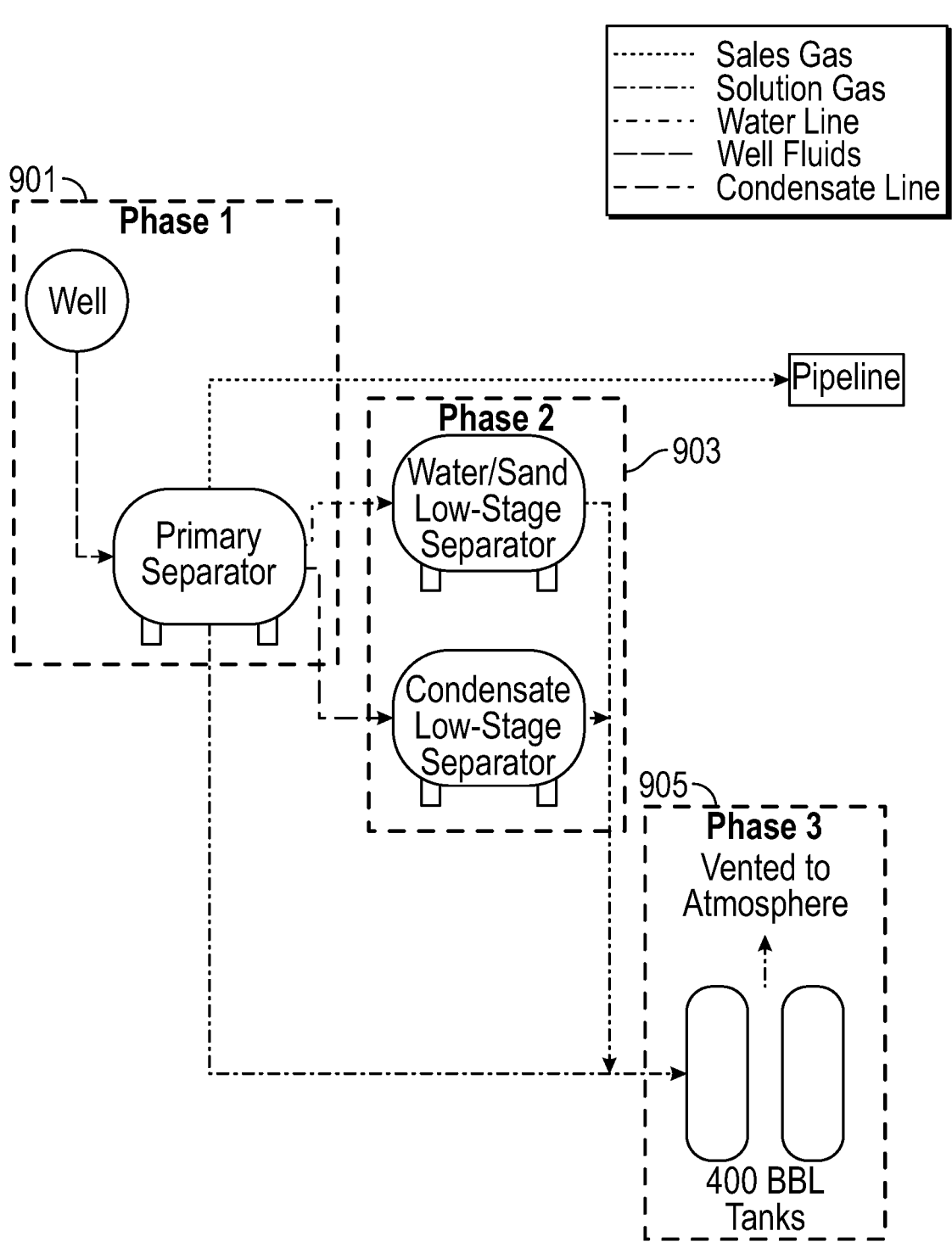
FIG. 9 shows the process flow diagram for flowback operations using venting from 400 bbl tanks.
Figure 10:
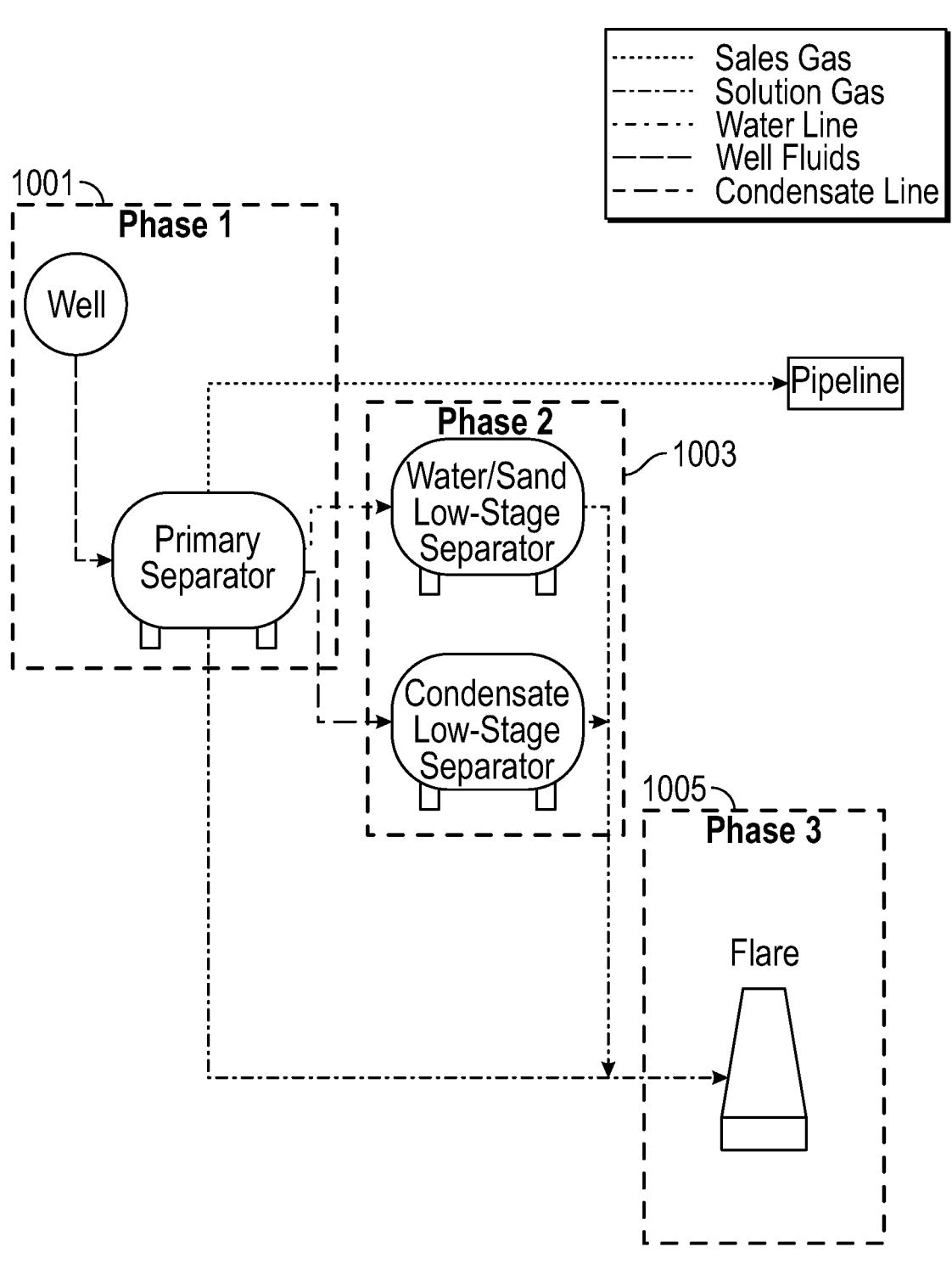
FIG. 10 shows the process flow diagram for flowback operations using flaring.

FIGS. 9 and 10 illustrate the common approaches to the completions operations of venting the collected solution gas to the atmosphere (FIG. 9) and flaring the solution gas to the atmosphere (FIG. 10). While each process comprises a first stage of separation (901 and 1001) and a second stage of separation (903 and 1003) there is no collection of solution gas resulting from either stages in these processes as the resulting stream from the first separator which is not sent to the pipeline is further processes to facilitate the disposal of the solution gas (either by venting (905) or flaring 1005)).

Figure 11:
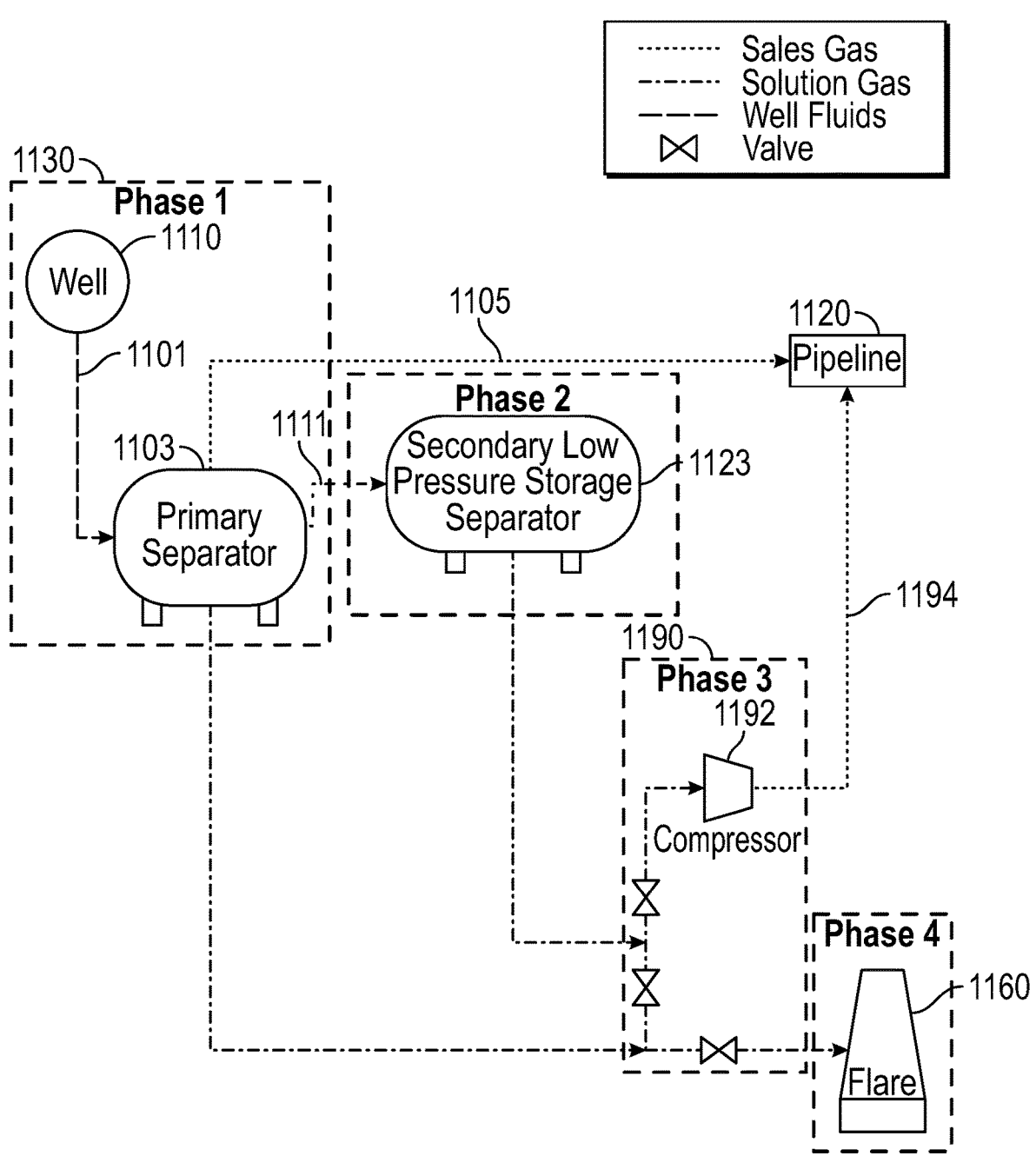
FIG. 11 illustrates a simplified process flow diagram for flowback operations according to a preferred embodiment of the present invention.

In referring to FIG. 11, according to another preferred embodiment of the present invention, in a first phase (1130) of the process, high velocity well fluids (1101) are produced from the well (110) and flowed to a primary separator (1103). The primary separator (1103) separates the pipeline-worthy gas into a stream (1105) and sends it to the pipeline (1120). A stream of condensate (1111) can be extracted from the primary separator (1103) and sent to a secondary sepa-rator (1123) where the solution gas is extracted from the water and sand and further sent to phase 3 (1190) to a compressor (1192). The compressed gas (1194) coming out of the separator is sent to the pipeline (1120). According to a preferred embodiment of the present invention, the pri-mary separator is still connected to the flare stack (160) in the case of emergency well upset or similar emergency.

Single Well Flare/Vent Gas Conservation Process Flow Diagram Breakdown

Figure 3:
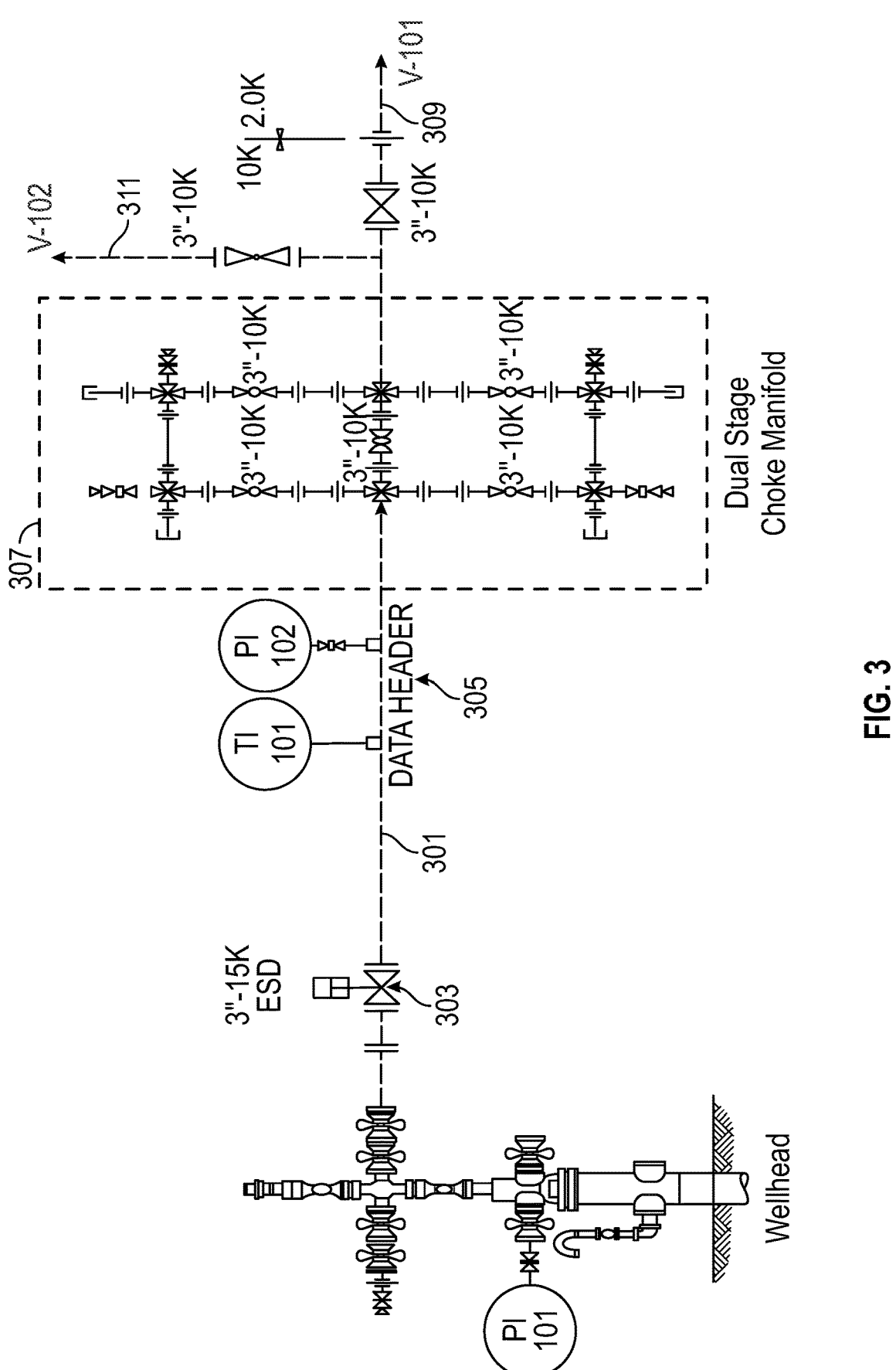
FIG. 3 is a first phase PFD with fluid flow from the wellhead to the separator units according to a preferred embodiment of the process of the present invention.

In the preferred embodiment illustrated in FIG. 3, well fluids (301) are flowed from the wellhead through the Emergency Shutdown (ESD)(303) and data headers (well fluid measurement tools)(305) to the dual stage choke mani-fold (307). The choke manifold (307) provides control of well flowback fluids or well treatment fluids. Well fluids are either flowed to the primary separator unit (V-101)(309) or the water sand low stage unit (V-102)(311) depending on the pressure of the well fluids. High pressure fluids are flowed to V-101 while low pressure fluids during initial well clean-up are flowed to V-102. Fluid flow direction to the primary separator (via V-101) and the secondary separator (via V-102) is determined by a two 3-inch ball valves at a tee downstream of the manifold.

Figure 4:
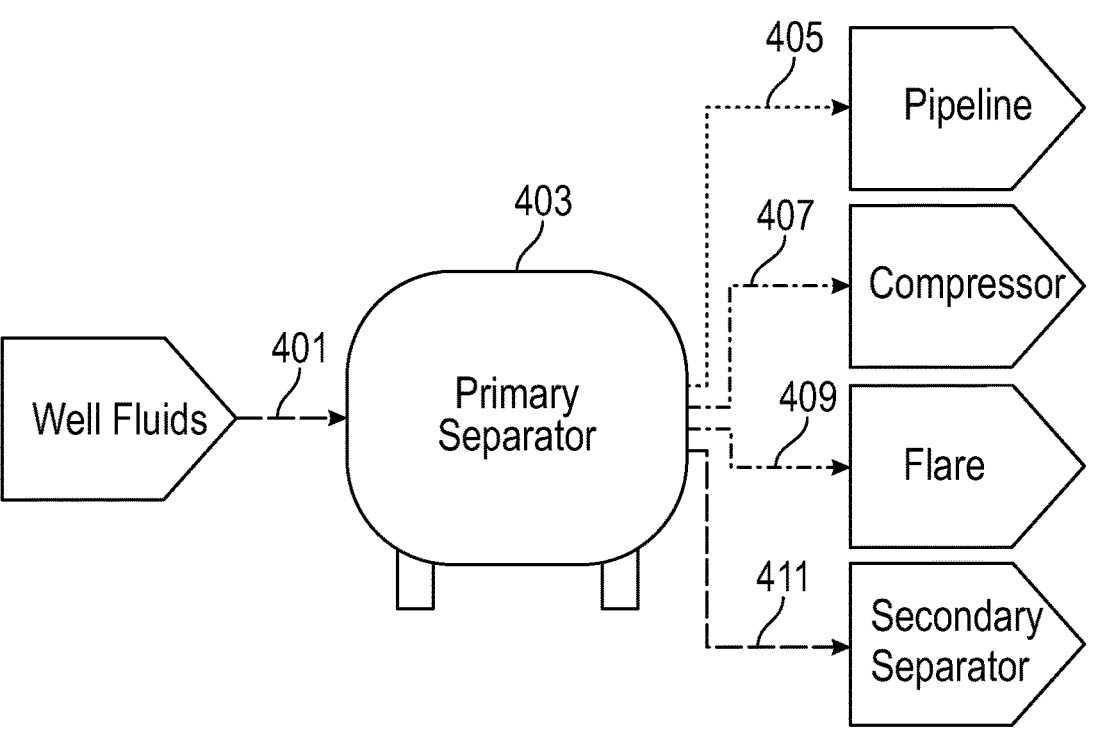
FIG. 4 illustrates a simplified process flow diagram for the primary separator flow according to a preferred embodiment of the present invention.

In the preferred embodiment illustrated in FIG. 4, the well fluids (401) flow into the primary separator (403) single inlet port. The primary separator (403) allows for the separation of most of the sand and water from the well fluid and sends the sand and water fluid (411) to the low stage water and sand separator secondary separator. Fluid flow from the sand outlet and water outlet is controlled by the pressure vessel and also has a 3-inch ball valve on the flow line. The condensate is mostly separated from the well fluids and flowed (407) to the compressor. The water and condensate volume is measured using the 2-inch flowmeter. The natural gas (405) is separated out, the volume is measured by the ABB total flow meter and flowed to the sales header (pipeline). The sales header line also has a 3-inch check valve which ensures gas flow only happens in one direction and a 3-inch ball valve to control fluid flow. In case of well upset there is a flare line (409) and a pressure safety valve (PSV) line to release over pressurized gas to the flare stack.

Figure 5:
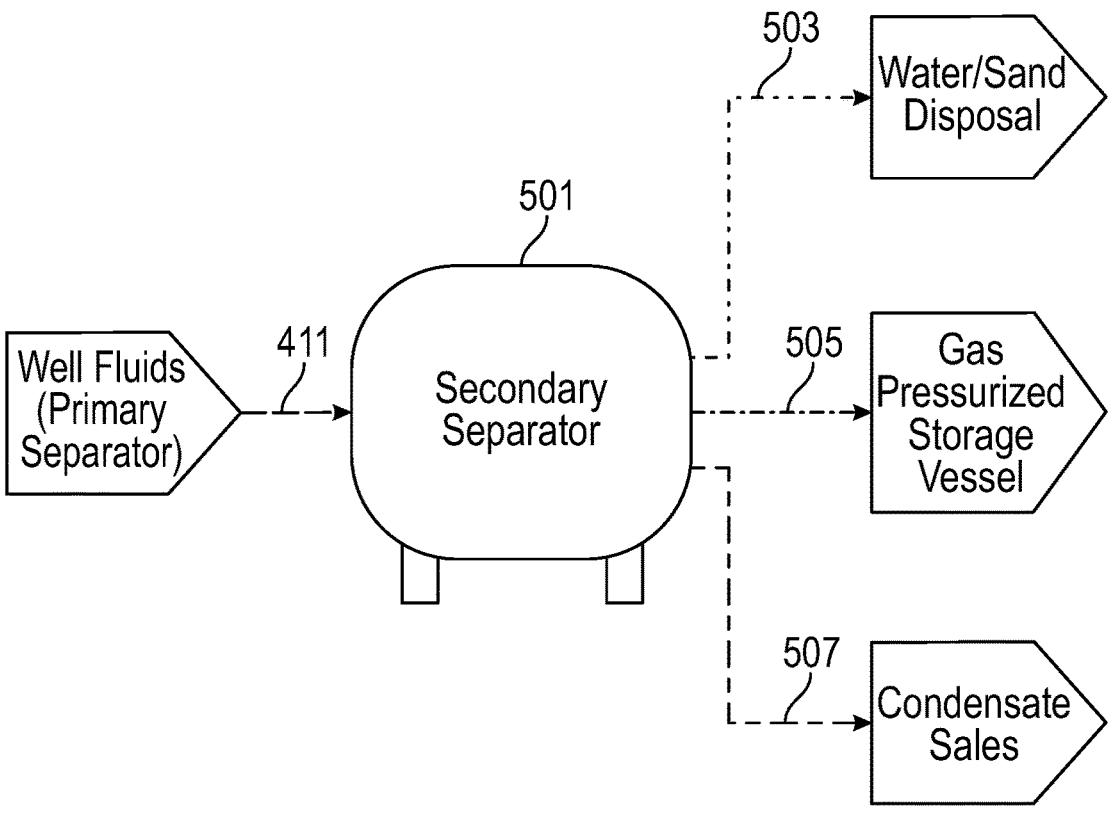
FIG. 5 illustrates a simplified process flow diagram for the secondary separator flow according to a preferred embodiment of the present invention.

In the preferred embodiment illustrated in FIG. 5, the low stage water and sand separator (501) (also referred to as the secondary separator) further separates the sand from the fluid and is pumped through the sand blowdown to the sand tanks through the sand load line (503) to be disposed of. Sand blowdown flow is controlled using 2 3-inch ball valves, with a pump point to pump water to move the solids along the flow line. The water is further separated ensuring as much as possible of the condensate and solution gas is removed from the fluid. The water is then measured by the 3-inch flowmeter and flowed and to the water tanks (C-Ring) to be disposed of properly. The solution gas is collected and flowed to a pressurized gas storage vessel (505). The vessels are set in series of each other with a bypass so gas can be flowed straight to the pressurized gas storage vessel or compressor bypass if needed. In case of well upset there is a PSV line to release over pressurized gas to a flare stack (see FIG. 7).

Figure 6:
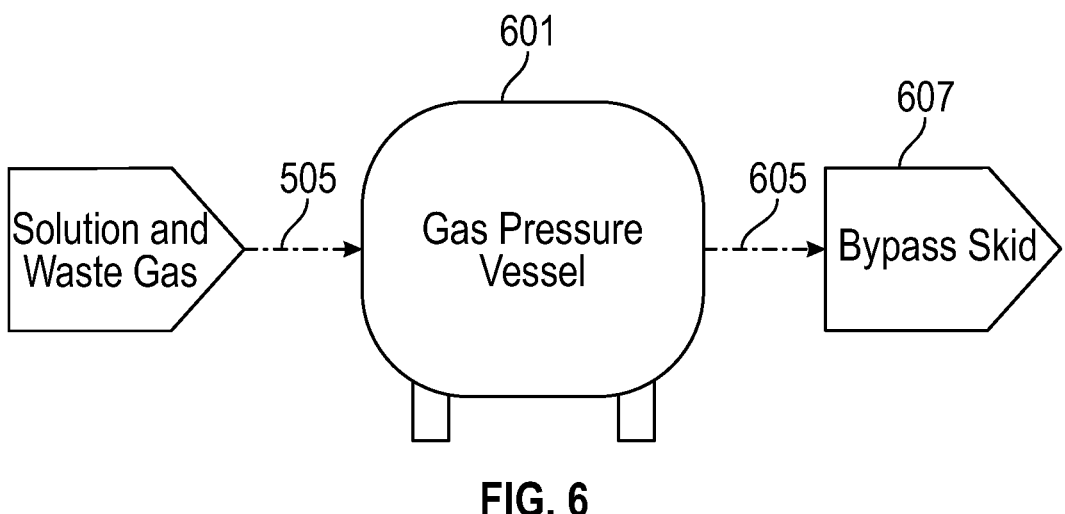
FIG. 6 illustrates a simplified process flow diagram for the gas pressure vessel flow according to a preferred embodiment of the present invention.

In the preferred embodiment illustrated in FIG. 6, the pressurized gas storage vessel (601) is a low stage unit for solution gas storage. The vessel collects the solution gas from the primary separator, the secondary separator as fluid flow (505) and sends such to the bypass skid (607) via flow line (605). The bypass skid (607) in turn, feeds into the compressor (see 711 in FIG. 7). This solution gas volume is measure using ABB total flow meter.

Figure 7:
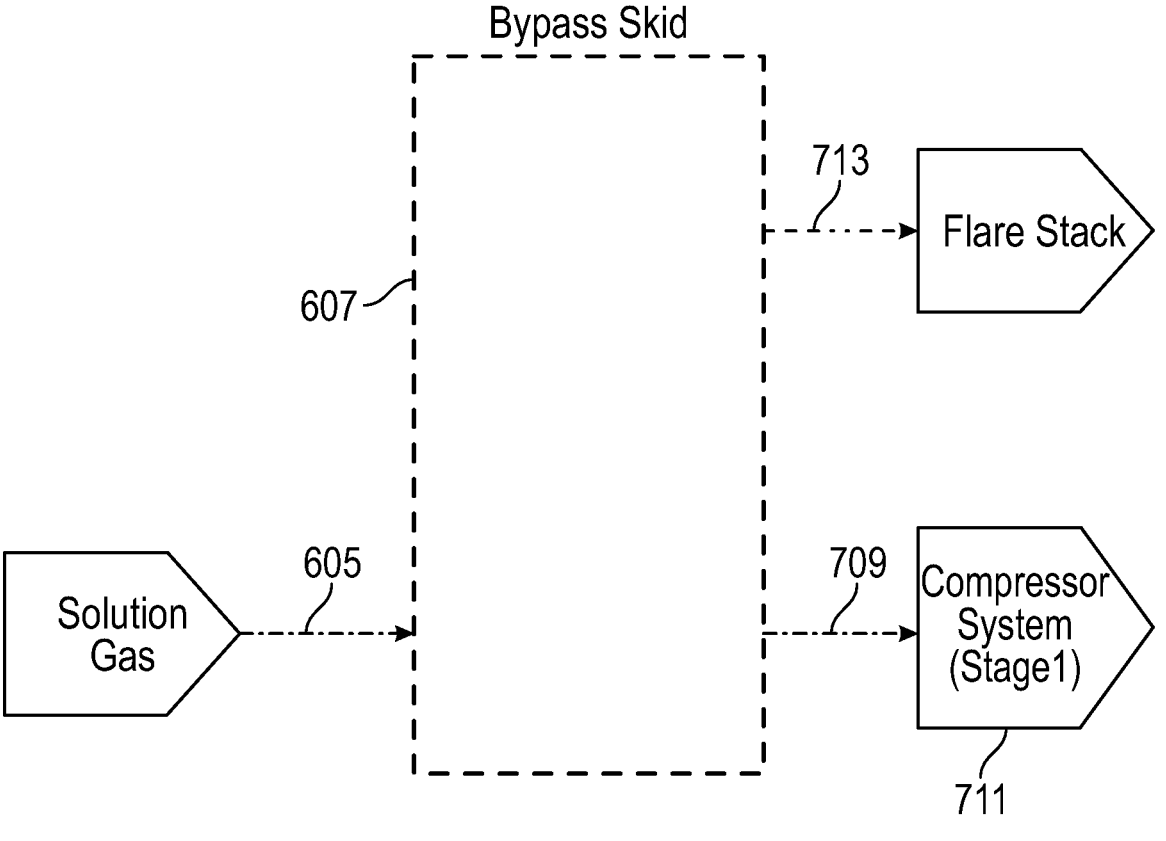
FIG. 7 illustrates a simplified process flow diagram for the bypass skid flow according to a preferred embodiment of the present invention.

In the preferred embodiment illustrated in FIG. 7, the solution and waste gas condensate (605) is collected from the preceding separation stages vessel and is sent through the bypass skid flow (607) to then reach the compressor system (711). In the case of emergency (overpressurized gas or the like) the gas flow may be diverted at the bypass skid (607) to a flare stack (713) for a temporary relief of the system.

Case Study

Data was collected from ConocoPhillips Canada's A-013-L pad, which is a 9 well pad, and have completed a case study on the amount of GHG emissions were released due to the solution gas. Measuring the solution gas through ABB flowmeters present on each of the separator units, the solution gas that was flared was 570.482 $e^3$ $m^3$ (thousands of cubic meters). This volume was recorded from Jan. 6, 2021 to Mar. 29, 2021 and is shown in Table 1. Other key data taken from the pad were the total hours each well was flowed during flowback operations and the composition of the gas taken from gas samples on PAD A-013-L. Table 2 highlights the total hours flowed on each well and Table 3 highlights the gas composition.

Using the case study data two scenarios are performed to demonstrate the total estimated GHG emissions on PAD A-013-L assuming both venting and flaring operations. All GHG emissions calculations utilize the formulas from the Western Climate Initiative (WCI) Quantification Methods. This exercise is used to give an estimate and quantify GHG emissions using the two most prevalent methods of disposal for waste solution gas. These values are estimates given all the data for PAD A-013-L and are used to estimate possible emissions reductions utilizing the process according to a preferred embodiment of the present invention. It is important to note that gas compositions and volumes may vary in different flowback completions and is only used for the purpose of providing a visual to GHG emissions.

Scenario A: GHG Emissions from Venting Solution Gas

In Scenario A, the measured solution gas produced during flowback on PAD A-013-L is assumed to be vented out of 400 bbl tanks to atmosphere. Venting is the release of natural gas to the atmosphere. The solution gas is under large amounts of pressure and temperature in the formation but when exposed to atmospheric pressures and temperatures the gas is released from the solution to the atmosphere. FIG. 9 shows the basic process flow for venting procedures broken down into simplified components.

TABLE 1

| Total volume of Gas flared from each separator on A-013-L PAD (Jan. 6-Mar. 29, 2021) | |
| --- | --- |
| Separators | Unit Cumm. (e3m3) |
| HS-29 | 3.89 |
| LS-38 | 8.83 |
| HS-37 | 25.24 |
| LS-31 | 68.65 |
| HS-11 | 3.98 |
| LS-29 | 47.65 |
| HS-35 | 1.46 |
| LS-46 | 187.42 |
| HS-08 | 23.60 |
| LS-44 | 51.36 |
| HS-07 | 22.72 |
| LS-33 | 34.60 |
| LS-59 | 50.42 |

TABLE 1-continued

| Total volume of Gas flared from each separator on A-013-L PAD (Jan. 6-Mar. 29, 2021) | |
| --- | --- |
| Separators | Unit Cumm. (e3m3) |
| LS-36 | 34.51 |
| LS-54 | 4.31 |
| LS-28 | 1.85 |
| Total | 570.48 |

TABLE 2

| Flow time on PAD A-013-L PAD for each well between Jan. 6-Mar. 29, 2021 | | |
| --- | --- | --- |
| Well Name | Total Flow time (hours) | Time Flowed to Flare (hours) |
| COP HZ Blueberry a-013-1/94-A-12 | 449.00 | 3.50 |
| COP HZ Blueberry a-A13-1/94-A-12 | 1023.17 | 14.75 |
| COP HZ Blueberry a-B13-1/94-A-12 | 481.33 | 4.17 |
| COP HZ Blueberry a-C13-1/94-A-12 | 753.50 | 7.83 |
| COP HZ Blueberry a-D13-1/94-A-12 | 1373.50 | 31.75 |
| COP HZ Blueberry a-E13-1/94-A-12 | 431.75 | 1.75 |
| COP HZ Blueberry a-F13-1/94-A-12 | 313.50 | 7.17 |
| COP HZ Blueberry a-G13-1/94-A-12 | 901.42 | 119.50 |
| COP HZ Blueberry a-H13-1/94-A-12 | 465.00 | 15.00 |
| total | 6192.17 | 205.42 |

TABLE #3

| Gas Analysis taken from PAD A-013-L | |
| --- | --- |
| Component | Mole Fraction |
| $H_2$ | 0.0000 |
| He | 0.0000 |
| $N_2$ | 0.0007 |
| $CO_2$ | 0.0009 |
| $H_2S$ | 0.0000 |
| $C_1$ | 0.6060 |
| $C_2$ | 0.2044 |
| $C_3$ | 0.1211 |
| $iC_4$ | 0.0185 |
| $C_4$ | 0.0304 |
| $iC_5$ | 0.0067 |
| $C_5$ | 0.0058 |
| $C_6$ | 0.0026 |
| $C_7$ | 0.0020 |
| $C_8$ | 0.0008 |
| $C_9$ | 0.0001 |
| $C_{10}$ | 0.0000 |
| $C_{11}$ | 0.0000 |
| $C_{12+}$ | 0.0000 |
| Total | 1.0000 |

Using the case study data two scenarios are performed to demonstrate the total estimated GHG emissions on PAD A-013-L assuming both venting and flaring operations. All GHG emissions calculations utilize the formulas from the Western Climate Initiative (WCI) Quantification Methods. This is carried out to give an estimate and quantify GHG emissions using the two most prevalent methods of disposal for waste solution gas. These values are estimates given all the data for PAD A-013-L and are used to estimate possible emissions reductions utilizing the process according to a preferred embodiment of the present invention. It is important to note that gas compositions and volumes may vary in different flowback completions and is only used for the purpose of providing a visual to GHG emissions.

Scenario A: GHG Emissions from Venting Solution Gas

In Scenario A, the measured solution gas produced during flowback on PAD A-013-L is assumed to be vented out of 400 bbl tanks to atmosphere. Venting is the release of natural gas to the atmosphere. The solution gas is under large amounts of pressure and temperature in the formation but when exposed to atmospheric pressures and temperatures the gas is released from the solution to the atmosphere.

High velocity well fluids are produced from the well and flowed to the primary separator. The primary separator separates the pipeline worthy gas and sends it to the pipeline. The remaining fluids are sent to phase 2. The solution gas from the primary separator is collected in 400 bbl tanks.

The second phase is where the well fluids undergo the final stage of separation at lower pressures. The water and sand are collected from the low stage separator and disposed of appropriately. The condensate is collected in the low stage condensate separator, making sure any remaining water and sand is removed, then collected to be sold. The remaining solution gas is separated through the low stage separators and collected in the 400 bbl tanks.

The third phase is the venting of the solution gas out of the 400 bbl tanks to atmosphere releasing high concentrations of methane to the atmosphere.

Calculations for GHG Emissions if Solution Gas is Vented

Calculations were performed to demonstrate the GHG emission if the solution gas on PAD A-013-L is vented. The composition of the gas as highlighted in Table 3 is primarily $CH_4$ which has a GWP 25 times greater than $CO_2$. Calculations were utilizing equations taken from the WCI 2011 the volumetric emissions of $CH_4$ and $CO_2$ are calculated using Equation 360-27 below:

(1) Estimate $CH_4$ and $CO_2$ emissions from natural gas emissions using Equation 360-27.

$$E_{s,i}=E_{s,n} \cdot M_i \qquad \text{Equation 360-27}$$

Where:

$E_{s,i}$=GHG i ($CH_4$ or $CO_2$) volumetric emissions at standard conditions.

$E_{s,n}$=Natural gas volumetric emissions at standard conditions.

$M_i$=Mole fraction of GHG i in the natural gas.

The volumetric emissions calculated using PAD A-013-L's data is 513 $m^3$ for $CO_2$ and 345,712 $m^3$ for $CH_4$. These volumetric values are then converted to mass emissions using Equation 360-28 (from WCI 2011) below. Table 4 highlights the volumetric emissions.

TABLE 4

Calculated Volumetric Data for CO2
and CH4 using equation 360-27

| Where Component | Value | Units |
|---|---|---|
| $E_{s,\,n}$ | 570.482 | $e^3m^3$ |
| $M_{CH4}$ | 0.6060 | Mol. Frac. |
| $M_{CO2}$ | 0.0009 | Mol. Frac. |
| $E_{s,\,CH4}$ | 345712.092 | $m^3$ |
| $E_{s,\,CO2}$ | 513.4338 | $m^3$ |

(s) GHG mass emissions. Calculate GHG mass emissions in carbon dioxide equivalent at standard conditions by converting the GHG volumetric emissions into mass emissions using Equation 360-28.

$$\text{Mass}_{s,i}=E_{s,i} \times \rho_i \times GWP_j \times 0.001 \qquad \text{Equation 360-25}$$

Where:

$\text{Mass}_{s,i}$=GHG i (either $CH_4$ or $CO_2$) mass emissions at standard conditions (tonnes $CO_2$e)

$E_{s,i}$=GHG i (either $CH_4$ or $CO_2$) volumetric emissions at standard conditions ($m^3$)

$r_i$=Density of GHG i (1.86 lkg/$m^3$ for $CO_2$ and 0.678 kg/$m^3$ for $CH_4$ at STP of 15 degrees Celsius and 1 atmosphere)

GWP=Global warming potential of GHG i (1 for $CO_2$ and 25 for $CH_4$)

0.001 Conversion factor from kilograms to tonnes.

TABLE 5

Calculated Mass Emissions Venting Operations

| Where component | value | Units |
|---|---|---|
| $E_{S,\,CH4}$ | 345712.092 | $m^3$ |
| $E_{S,\,CO2}$ | 513.4338 | $m^3$ |
| GWP CH4 | 25 | tonnes $CO_{2\text{-}eq}$/tonne |
| GWP CO2 | 1 | tonnes $CO_{2\text{-}eq}$/tonne |
| $\rho_{CH4}$ | 0.678 | kg/$m^3$ |
| $\rho_{CO2}$ | 1.861 | kg/$m^3$ |
| $\text{Mass}_{s,\,CH4}$ | 5859.819959 | tonnes $CO_{2\text{-}eq}$ |
| $\text{Mass}_{s,\,CO2}$ | 0.955500302 | tonnes $CO_{2\text{-}eq}$ |
| Total $CO_2$-eq | 5860.77546 | tonnes $CO_{2\text{-}eq}$ |

The mass emissions calculated for $CO_2$ are 0.96 tonnes $CO_2$-eq and the mass emissions for $CH_4$ is 5,860 tonnes $CO_2$-eq, highlighted in Table 5. The total calculated mass emissions are the sum of the emissions from $CO_2$ and $CH_4$. The total calculated emissions for the 9 well PAD A-013-L during flowback operations is 5,861 tonnes $CO_2$-eq.

Scenario B: GHG Emissions from Flaring Solution Gas

In Scenario B, the measured solution gas produced during flowback on PAD A-013-L is assumed to be sent to a flare stack and combusted. By combusting the solution gas, the methane is combusted into $CO_2$ which reduces the GHG emissions. FIG. 10 shows the basic process for flaring operations during flowback operations.

High velocity well fluids are produced from the well and flowed to the primary separator. The primary separator separates the pipeline worthy gas and sends it to the pipeline. The remaining fluids are sent to phase 2. The solution gas is collected and flowed to the flare stack.

The second phase is where the well fluids undergo the final stage of separation at lower pressures. The water and sand are collected from the low stage separator and disposed of appropriately. The condensate is collected in the low stage condensate separator, making sure any remaining water and sand is removed, then collected to be sold. The remaining solution gas is separated through the low stage separators and flowed to the flare stack.

The third phase is the flaring of the solution gas at the flare stack. The solution gas is combusted which converts the $CH_4$ to $CO_2$ to reduce GHG emissions.

Calculations for GHG Emissions if Solution Gas is Flared

Because $CH_4$ has a Global Warming Potential (GWP) 25 times greater than that of $CO_2$, combusting the $CH_4$ and converting it into $CO_2$ reduces the GHG emissions. This is calculated using equations taken from the WCI 2011. The volumetric flared emissions are calculated using Equations 360-15, 360-16, 360-17, 360-18 reproduced below:

(4) Calculate GHG volumetric emissions at actual conditions using Equations 360-15, 360-16, 360-17, and 360-18.

$$E_{a,CH4} = V_a \times (1 - \eta) \times X_{CH4} \qquad \text{Equation 360-15}$$

$$E_{a,CO2}(\text{noncombusted}) = V_a \times X_{CO2} \qquad \text{Equation 360-16}$$

$$E_{a,CO2}(\text{combusted}) = \sum_j \eta \times V_a \times Y_j R_j \qquad \text{Equation 360-17}$$

$$E_{a,CO2}(\text{total}) = \qquad \text{Equation 360-18}$$

$$E_{a,CO2}(\text{combusted}) + E_{a,CO2}(\text{noncombusted})$$

Where:

$E_{a,CH4}$=Contribution of annual noncombusted $CH_4$ emissions from flare stack under ambient conditions ($m^3$).

$E_{a,CO2}$ (non-combusted)=Contribution of annual $CO_2$ emissions from $CO_2$ in the inlet gas passing through the flare noncombusted under ambient conditions ($m^3$).

$E_{a,CO2}$ (combusted)=Contribution of annual $CO_2$ emissions from combustion from flare stack under ambient conditions ($m^3$).

$V_a$=Volume of natural gas sent to flare during the year ($m^3$).

$\eta$=Percent of natural gas combusted by flare (default is 98 percent). For gas sent to an unlit flare, is zero.

$X_i$=Mole fraction of GHG i in gas to the flare.

$Y_j$=Mole fraction of natural gas hydrocarbon constituents j (i.e., methane, ethane, propane, butane, and pentanes plus)

$R_j$=Number of carbon atoms in the natural gas hydrocarbon constituent j (i.e., 1 for methane, 2 for ethane, 3 for propane, 4 for butane, and 5 for pentanes plus).

TABLE 6

Calculated Volumetric Emissions Flaring Operations

| Where component | Value | Units |
|---|---|---|
| V | 570.482 | E3m3 |
| $\eta$ | 0.98 | |
| $X_{CH4}$ | 0.6060 | Mol frac |
| $X_{CO2}$ | 0.0009 | Mol frac |
| $E_a$, CH4 | 6914.24184 | $m^3$ |
| $E_a$, CO2 (noncombusted) | 513.4338 | $m^3$ |
| $E_a$, CO2 (combusted) | 935383.9655 | $m^3$ |
| $E_a$, CO2 (total) | 935897.3993 | $m^3$ |

The volumetric emissions using for flaring operations using PAD A-013-L's data are calculated to be 935,897 m3 for CO2 and 6,914 m3 for $CH_4$, highlighted in table 6. These volumetric values are then converted to mass emissions again using Equation 360-28.

TABLE 7

Calculated Mass Emissions Flaring Operations

| Where component | value | Units |
|---|---|---|
| $E_{S, CH4}$ | 6914.24184 | m3 |
| $E_{S, CO2}$ | 935897.3993 | m3 |
| GWP $CH_4$ | 25 | tonnes $CO_{2\text{-}eq}$/tonne |

TABLE 7-continued

Calculated Mass Emissions Flaring Operations

| Where component | value | Units |
|---|---|---|
| GWP $CO_2$ | 1 | tonnes $CO_{2\text{-}eq}$/tonne |
| $\rho_{CH4}$ | 0.678 | kg/m$^3$ |
| $\rho_{CO2}$ | 1.861 | kg/m$^3$ |
| Mass$_{s, CH4}$ | 1741.70506 | tonnes $CO_{2\text{-}eq}$ |
| Mass$_{s, CO2}$ | 117.1963992 | tonnes $CO_{2\text{-}eq}$ |
| Total $CO_2$-eq | 1858.901459 | tonnes $CO_{2\text{-}eq}$ |

The mass emissions calculated for CO2 are 117 tonnes $CO_2$-eq and the mass emissions for CH4 is 17,412 tonnes $CO_2$-eq, highlighted in Table 7. The total calculated mass emissions are the sum of the emissions from CO2 and CH4. The total calculated emissions for the 9 well PAD A-013-L during flowback operations is 1,859 tonnes of $CO_2$-eq.

Calculated GHG Emissions Reduction

Using PAD A-013-L as a case study, calculations were carried out in order to estimate the GHG emissions reduction possible utilizing a preferred embodiment of the process according to the present invention versus standard venting or flaring operations. In comparison to venting and flaring operations, the sources of GHG emissions come from the compressor system and the fuel consumption needed to run the system's power source during the compression process, in this case a natural gas driven engine. According to a preferred embodiment, the process seeks to eliminate all GHG emissions from flaring or venting solution gas.

The maximum fuel consumption rate is used to determine the total amount of fuel possibly needed during flowback operations. The maximum fuel consumption is 1,203 m$^3$/day. This is converted to an hourly rate of 50.13 m$^3$/hour, which is the fuel requirement of 100% load, which is conservative. The total hours where solution gas was flowed to flare on PAD A-013-L was recorded to be 205.42 hours as shown in Table 2. The total amount of fuel needed is then calculated by multiplying the fuel consumption per hour by the total hours flowed to flare and, is calculated to be 10,297 m$^3$.

Compressor run equivalent to hours with volumes to flare at A-013-L is conservative because the gas storage for the process functions as an accumulator tank so that volumes can be reserved until a suitable amount of waste gas is available to enable efficient operation of the compressor. The compressor is automated to start based on sufficient waste gas volumes and rate (pressure) being available from gas storage and stop again when the pressure becomes too low, so the total number of hours the compressor will run will be less than the hours recorded at PAD A-013-L. The mass of $CO_2$-eq can then be calculated using Equation 20-1 from the WCI 2011 as shown below:

Calculation Methodology 1. Calculate the annual $CO_2$ mass emissions for each type of fuel by substituting a fuel-specific default $CO_2$ emission factor, a default high heat value, and the annual fuel consumption into Equation 20-1:

$$CO_2 = \text{Fuel} \times HHV \times EF \times 0.001 \qquad \text{Equation 20-1}$$

Where:

$CO_2$=

Fuel=Mass or volume of fuel combusted per year (express mass in tonnes for solid fuel, volume in standard cubic meters for gaseous fuel, or volume in kilolitres for liquid fuel).

HHV=Default high heat value of the fuel, from Table 20-1 and 20-1a (GJ per tonne for solid fuel, GJ per kilolitre for liquid fuel, or GJ per cubic meter for gaseous fuel).

EF=Fuel-specific default $CO_2$ emission factor, from Tables 20-1a, 20-2, 20-3, 20-5, or 20-7, as applicable (kg $CO_2$/GJ).

(HEW×EF) instead of using separate HHV and EF values, you can replace the two values by using default emission factors from Tables 20-2, 20-3, or 20-5, as applicable (in units of kg $CO_2$ per tonne for solid fuel, kg $CO_2$ per kilolitre for liquid fuel, or kg $CO_2$ per cubic meter for gaseous fuel)

0.001=Conversion factor from kilograms to tonnes.

TABLE 8

Calculated Mass Emissions from Compressor
System Fuel Consumption

| Where component | value | Units |
|---|---|---|
| HHV Natural Gas | 0.03832 | GJ/m$^3$ |
| Default CO2 emission Factor Nat Gas | 56.13 | kg $CO_2$/GJ |
| Max Compressor System estimated Fuel Consumption | 1203 | m$^3$/day |
| Total Fuel Consumption over life of A-13-L | 10296.6775 | m$^3$ |
| Mass$_{s, CO2, A-13-L}$ | 22.14714011 | tonnes $CO_2$-eq |

TABLE 9

Calculated Volumetric Emissions from Compressor System

| Where component | value | Units |
|---|---|---|
| $E_{S, CO2}$ | 22.375 | Sm$^3$/month |
| $E_{S, CH4}$ | 1.2416667 | Sm$^3$/month |
| Count | 1 | Unit |
| $EF_{CO2}$ | 268.5 | Sm$^3$/year |
| $EF_{CH4}$ | 14.9 | Sm$^3$/year |
| $EF_{CO2}$ | 22.374 | Sm$^3$/month |
| $EF_{CH4}$ | 1.241666667 | Sm$^3$/month |

TABLE 10

Total Calculated CO2-eq Emissions for compressor system

| Where component | value | Units |
|---|---|---|
| $E_{S, CO2}$ | 22.375 | m3 |
| $E_{S, CH4}$ | 1.2416667 | m3 |
| GWP CH4 | 25 | tonnes $CO_{2-eq}$/tonne |
| GWP CO2 | 1 | tonnes $CO_{2-eq}$/tonne |
| $\rho_{CH4}$ | 0.678 | kg/m$^3$ |
| $\rho_{CO2}$ | 1.861 | kg/m$^3$ |
| Mass$_{s, CH4}$ | 0.04163988 | tonnes $CO_{2-eq}$/month |
| Mass$_{s, CO2}$ | 0.02104625 | tonnes $CO_{2-eq}$/month |
| Total $CO_2$-eq | 0.06268613 | tonnes $CO_{2-eq}$/month |
| Total emissions for A-13-L | 22.3351985 | tonnes $CO_{2-eq}$ |

The total emissions from fuel consumption are determined to be 22.15 tonnes $CO_2$-eq. The Project utilizes a hydraulic compressor which does not have any operational venting procedures. A calculation was still completed to account for any possible emissions from the compressor during its operation in the case there were any minimal venting GHG emissions.

Equation 360-22 is used to calculate the emissions volumetric emissions for $CH_4$ and $CO_2$ by multiplying the one compressor by the corresponding emissions factors for $CH_4$ and $CO_2$ assuming standard conditions. The emission factor (EF) for $CH_4$ is 268.5 Sm3/year and 14.9 Sm3/year for $CO_2$ as described in the equation. The volumetric emissions are then converted to a mass in tonnes $CO_2$ emitted using Equation 360-28. The calculated emissions are then scaled to the total months the compressor will be utilized during the flowback operations.

Onshore petroleum and natural gas production shall calculate emissions from well-site reciprocating compressors as follows using Equation 360-22:

$$E_{s,i} = Count \times EF_i \qquad \text{Equation 360-22}$$

Where:

$E_{s,i}$=Annual total volumetric GHG emissions at standard conditions from reciprocating compressors (m$^3$/year).

Count=Total number of well-site reciprocating compressors for the reporter.

$EF_i$=Emission factor for GHG i (either $CH_4$ or $O_2$). Use 272.7 Sm$^3$/year per compressor for $CH_4$ and 15.2 Sm$^3$/year per compressor for $CO_2$ at 20° C. and 1 atmosphere or 268.5 Sm$^3$/year per compressor for $CH_4$ and 14.9 Sm$^3$/year per compressor for $CO_2$ at 15.6° C. and 1 atmosphere, or as adjusted for different temperatures.

Total Project emissions is the sum of emissions from fuel consumption and the emissions from the compressor and the calculated emissions during PAD A-013-L is 22.3 tonnes $CO_2$-eq. By analysis it is easy to see that the emissions saved by implementing the process has huge benefits in terms of GHG emissions reductions. GHG emissions reductions are calculated by taking the traditional operations or base case and subtracting the emissions from the new process. This gives a tangible value of how much GHG emissions are being reduced by implementing the process. In comparison to venting operations, the GHG emissions reductions are 5,838 tonnes $CO_2$-eq. In comparison to flaring operations, the GHG emissions reductions are 1,837 tonnes $CO_2$-eq.

TABLE 11

Total emissions reductions for flaring and venting operations

| Where component | value | Units |
|---|---|---|
| | | Tonnes $CO_2$-eq |
| Emissions reductions (venting) for A-13-L | 5838.440261 | Tonnes $CO_2$-cq |
| Emissions reductions (flaring) for A-13-L | 1836.566261 | Tonnes $CO_2$-eq |

Summary

It is important to understand current industry practices utilize both venting and flaring operations. As of right now there are now regulations that mandate flaring of solution gas in Alberta but in British Columbia there are regulations against venting solution gas. It is difficult to estimate what percent of wells utilize which operation, so a sensitivity analysis was performed to show the total possible emissions if either venting or flaring operations are used. Comparing venting to flaring, it is estimated venting produces more than 3-times as much carbon emissions as flaring procedures. Assuming venting operations are used on PAD A-013-L, the GHG emissions are calculated to be 5,861 tonnes $CO_2$-eq. Assuming flaring operations are used on PAD A-013-L, the total calculated GHG emissions is 1,859 tonnes $CO_2$-eq. This is also only considering operations for one 9 well pad over a 3-month period. Broken down per well by dividing the GHG emissions by the number of wells (in this case 9), one can get a general estimate for emissions per well for each operation. Venting operation on average calculated GHG emissions per well was 651.2 tonnes $CO_2$-eq and flaring operations on average calculated GHG emissions per well was 206.5 tonnes of $CO_2$-eq.

These values can be used to further scale estimated GHG emissions due to venting or flaring of solution gas during the flowback process. In 2019, 442 natural gas wells were drilled in Alberta and British Columbia that could have utilized the process according to a preferred embodiment of the present invention. In 2020, 132 natural gas wells were drilled in Alberta and British Colombia that could utilize the patent process (BOE Report 2021). Taking the wells drilled in 2019 and 2020 to provide a general estimate of emissions due to disposal of solution gas, it is evident that massive amounts of GHG emissions are being released. In 2019, assuming all wells used venting operations and all emissions from the wells are similar to the emissions from the wells on PAD A-013-L, the GHG emissions are estimated to be 287,829 tonnes $CO_2$-eq. Similarly, the estimated emissions if all wells used flaring operations in 2019 is 91,292 tonnes $CO_2$-eq. This exercise was completed for 2020 as well even though 2020 was heavily influenced by COVID-19 which had a direct effect on the number of wells drilled. In 2020 estimated venting operations GHG emissions are 85,958 tonnes $CO_2$-eq and the estimated flaring operations GHG emissions are 27,264 tonnes $CO_2$-eq.

TABLE 12

GHG emissions for flaring and venting operations of PAD A-103-L and Estimated for 2019 and 2020

| Where | value | Units |
|---|---|---|
| Scenario | | Tonnes $CO_2$-eq |
| Total venting GHG Emissions for A-13-L | 5860.77546 | Tonnes $CO_2$-eq |
| Total flaring GHG Emissions for A-13-L | 1858.901459 | Tonnes $CO_2$-eq |
| Venting GHG Emissions per well for A-13-L | 651.1972733 | Tonnes $CO_2$-eq |
| Flaring GHG Emissions per well for A-13-L | 206.5446066 | Tonnes $CO_2$-eq |
| Estimated venting GHG Emissions for 2019 | 287829.1948 | Tonnes $CO_2$-eq |
| Estimated flaring GHG Emissions for 2019 | 91292.7161 | Tonnes $CO_2$-eq |
| Estimated venting GHG Emissions for 2019 | 85958.04008 | Tonnes $CO_2$-eq |
| Estimated flaring GHG Emissions for 2019 | 27263.88807 | Tonnes $CO_2$-eq |

Performing the sensitivity analysis provides an immediate need for steps need to be taken to provide a closed loop flowback process that captures more of the GHG emissions. The proposed compression process could revolutionize the completions industry by removing venting or flaring of solution gas during operations and essentially eliminating GHG emissions during the flowback process.

By breaking down the GHG emissions per well for the new process, it is estimated that per well on A-013-L, 2.48 tonnes of $CO_2$-eq are produced. This is a significant decrease in $CO_2$-eq in comparison to flaring or venting operations. Reductions were calculated for 2019 and 2020 for both venting and flaring operations shown in Table 13 below.

TABLE 13

GHG emissions reductions for flaring and venting operations of PAD A-103-L and Estimated for 2019 and 2020

| Where | value | Units |
|---|---|---|
| component | | Tonnes $CO_2$-eq |
| Total Emissions for A-13-L | 22.33519848 | Tonnes $CO_2$-eq |
| Estimated Emissions per well for A-13-L | 2.48168872 | Tonnes $CO_2$-eq |
| Estimated GHG Emissions reductions vs venting for 2019 | 286732.2884 | Tonnes $CO_2$-eq |
| Estimated GHG Emissions reductions vs flaring for 2019 | 90195.80968 | Tonnes $CO_2$-eq |
| Estimated GHG Emissions reductions vs venting for 2020 | 85630.45717 | Tonnes $CO_2$-eq |
| Estimated GHG Emissions reductions vs flaring for 2020 | 26936.30515 | Tonnes $CO_2$-eq |

By assuming every well drilled utilizes flaring of solution gas during completions operations, in 2019, 90,196 tonnes of $CO_2$-eq and in 2020, 26,936 tonnes of $CO_2$-eq could have been conserved. This is assuming best case scenario where all well utilize flaring which is most certainly not the case. This highlights the benefit of implementation of the patent process.

Economic Analysis

An economic analysis was completed using the Case Study on PAD A-013-L. The cost is calculated using an estimated breakdown of all the required equipment and labour necessary to implement the process.

Total Estimated Cost for Patent Process Pilot Implementation

The equipment cost for the patent process pilot comprises:

Total Equipment Cost=$764,092.00

Equipment Cost Breakdown: Pressure Control and Bypass skid=$40,232.00

Storage Tank Components=$82,385.00

Compressor=$618,550.00

Supply Line System=$22,925.00

The labour costs are based on the costs of an operations team upon implementation of a preferred embodiment of the process according to the present invention. Site Specific Design/Engineering and Project Management allows for costs to implement the new equipment within an already functional flowback operations design ($15,000). Construction/installation allow for the new compressor and associated equipment to be installed and tied-into an already functional design ($40,000). Reporting allows for metering required to enable post-Project GHG reporting and verification ($10,000). Testing and Verification allows for the post-Project GHG reporting to be created and then validated by a third-party ($20,000). The total estimated cost is $849,092.

Total Estimated Savings for Patent Process Implementation

The largest form of cost savings is due to the carbon tax savings from utilizing the process according to a preferred embodiment of the present invention. Preferably, the process provides a significant reduction to GHG emissions. Currently, the British Columbian government has a $40/per tonne $CO_2$-eq carbon tax, and the federal government has instated a $30/per tonne $CO_2$-eq carbon tax. With both the provincial and federal tax to be increased yearly until 2022. PAD A-013-L was drilled in BC so the tax per tonne of $CO_2$ emitted for the oil and gas producer is 70$/tonne $CO_2$-eq.

This heavily incentivises oil and gas producers to significantly reduce their GHG emissions. PAD A-013-L used flaring operations and it is estimated that $128,600 could have been saved in carbon tax credit savings for the single pad. As of March 2021, Alberta natural gas prices are 2.54$CDN/GJ (Alberta Economic Dashboard 2021). The total value of the conserved natural gas that is uplifted to market gas quality is $18,316. In total between the savings in carbon tax credits and extra saleable gas, $146,916 could have been saved on PAD A-013-L by utilizing the process. Using the economics of PAD A-013-L, if the process was used for a full calendar year, the payback period for the compressor would be 1.65 years.

If all the drilled wells in 2019 utilized the process instead of venting during flowback, an estimated $20,148,044 could have been saved and in 2020 an estimated $6,017,063 could have been saved. Similarly, if all the drilled wells in 2019 utilized the process instead of flaring during flowback, an estimated $7,215,208 could have been saved and in 2020 an estimated $2,154,768 could have been saved. The process according to a preferred embodiment of the present invention has huge economic implications and savings which will only increase based on carbon tax acceleration. The federal government will set the carbon tax to $50/tonnes $CO_2$-eq by 2022 with the possibility of increasing further. The economic viability will become even greater as the carbon tax increases and the need for closed loop flowback process will be mandatory for sustainable operations. Table 14 below highlights the potential savings vs venting or flaring.

TABLE 14

| Estimated cost saving using the compressor system vs Flaring and Venting Operations on PAD A-013-L and Estimated for 2019 and 2020 | |
| --- | --- |
| Where Scenario | Value |
| Total savings for A-13-L if venting | $410,254 |
| Total savings for A-13-L if flaring | $146,916 |
| Estimated savings per well for A-13-L if venting | $45,584 |
| Estimated savings per well for A-13-L if flaring | $16,324 |
| Estimated savings vs venting 2019 | $20,148,044 |
| Estimated savings vs flaring 2019 | $7,215,208 |
| Estimated savings vs venting 2020 | $6,017,063 |
| Estimated savings vs flaring 2020 | $2,154,768 |

According to a preferred embodiment of the present invention, the process comprising the use of pressurized vessel and adapted compressors allows for closed loop flowback completions operations which will eliminate routine flaring and venting. This has significant GHG emissions reduction potential as demonstrated in the measurements taken on PAD A-013-L in the case study. During the completions process 570.482 e3 m3 of natural gas was flared during flowback. The calculated GHG emissions produced from the flowback operations were 1,859 tonnes of $CO_2$-eq. If the patent process were implemented, it is estimated that majority of these emissions could have been reduced as the process would have only produced 22.3 tonnes of $CO_2$-eq if used on PAD A-013-L instead of flaring the entire amount of gas (570.482 $e^3$ $m^3$). This would amount to 1,837 tonnes of $CO_2$-eq conserved and a total savings in carbon tax credits and saleable gas of $146,916. Preferably, this process has the potential for massive reductions in GHG emissions as well as significant savings for oil and gas producers. The process according to a preferred embodiment of the present invention utilizes advanced measurement technologies, pressurized vessels, and proprietary compression systems to conserve waste solution gas to the pipeline instead of having them being vented or flared.

While the foregoing invention has been described in some detail for purposes of clarity and understanding, it will be appreciated by those skilled in the relevant arts, once they have been made familiar with this disclosure that various changes in form and detail can be made without departing from the true scope of the invention in the appended claims.

The invention claimed is:

1. A process for the reduction of flaring/venting gases during completions operations on an oil/gas well, said process comprising the steps of:
   providing a well in need of completion;
   providing a system to capture oil and gas generated by said well; wherein said system comprises:
      a primary separator that separates an incoming well stream into:
         a first stream of pipeline-worthy gas;
         a second stream of fluids;
         a third stream of gas which is collected; and
         a fourth stream of oil condensate which is collected;
      wherein said first stream of pipeline-worthy gas is sent to a pipeline,
      wherein said second stream of fluids is sent for further processing;
      a low pressure stage separator that removes water and sand from said second stream of fluids and said low pressure stage separator generates a fifth stream of oil condensate which is collected;
      a low stage condensate separator wherein said fourth stream of oil condensate and said fifth stream of oil condensate are collected, and said low stage condensate separator generates a sixth stream of gas which is collected;
      a compression unit;
   flowing said third stream of gas and said sixth stream of gas to a gas pressure vessel;
   collecting said third stream of gas and said sixth stream of gas in said gas pressure vessel;
   performing compression of said collected third and sixth streams of gas in said gas pressure vessel to create collected compressed gas until parameters of said collected compressed gas are such that said collected compressed gas is provided as a constant feed to said pipeline; and
   transferring said collected compressed gas to said gas pipeline.

2. The process according to claim 1, wherein said performing compression is carried out using a compressor comprising a built-in system to monitor the pressure of the collected compressed gas.

3. The process according to claim 1, further comprising a flare stack only for use in an emergency case.

4. The process according to claim 1, wherein said performing compression of said collected gas is carried out in two stages, a first compression stage using first and second reciprocating compressor systems to pressurize the collected gas from approximately 40 psi (275.8 kPa) to approximately 400 psi (2,757.9 kPa) at a flow rate of 15.4 $e^3$ $m^3$/day, and flowing the resulting compressed gas obtained from the first stage to a second compression stage.

5. The process according to claim 4, wherein said second stage of compression uses a third reciprocating compressor system which can pressurize the compressed gas obtained from the first stage from approximately 400 psi to approximately 700 psi to 800 psi at a flow rate of 15.0 $e^3$ $m^3$/day.

6. The process according to claim 4, wherein said compression carried out in two stages is carried out via a compressor system which is designed to handle a two-phase flow.

7. The process according to claim 1, wherein said system to capture oil and gas further comprises a metering unit adapted to measure the volume of at least one of said first, second, third, fourth, fifth, and sixth streams.

* * * * *